Oct. 7, 1941.    R. A. JENTSCH    2,257,802
CLUTCH MEANS
Filed Jan. 25, 1939    3 Sheets-Sheet 1
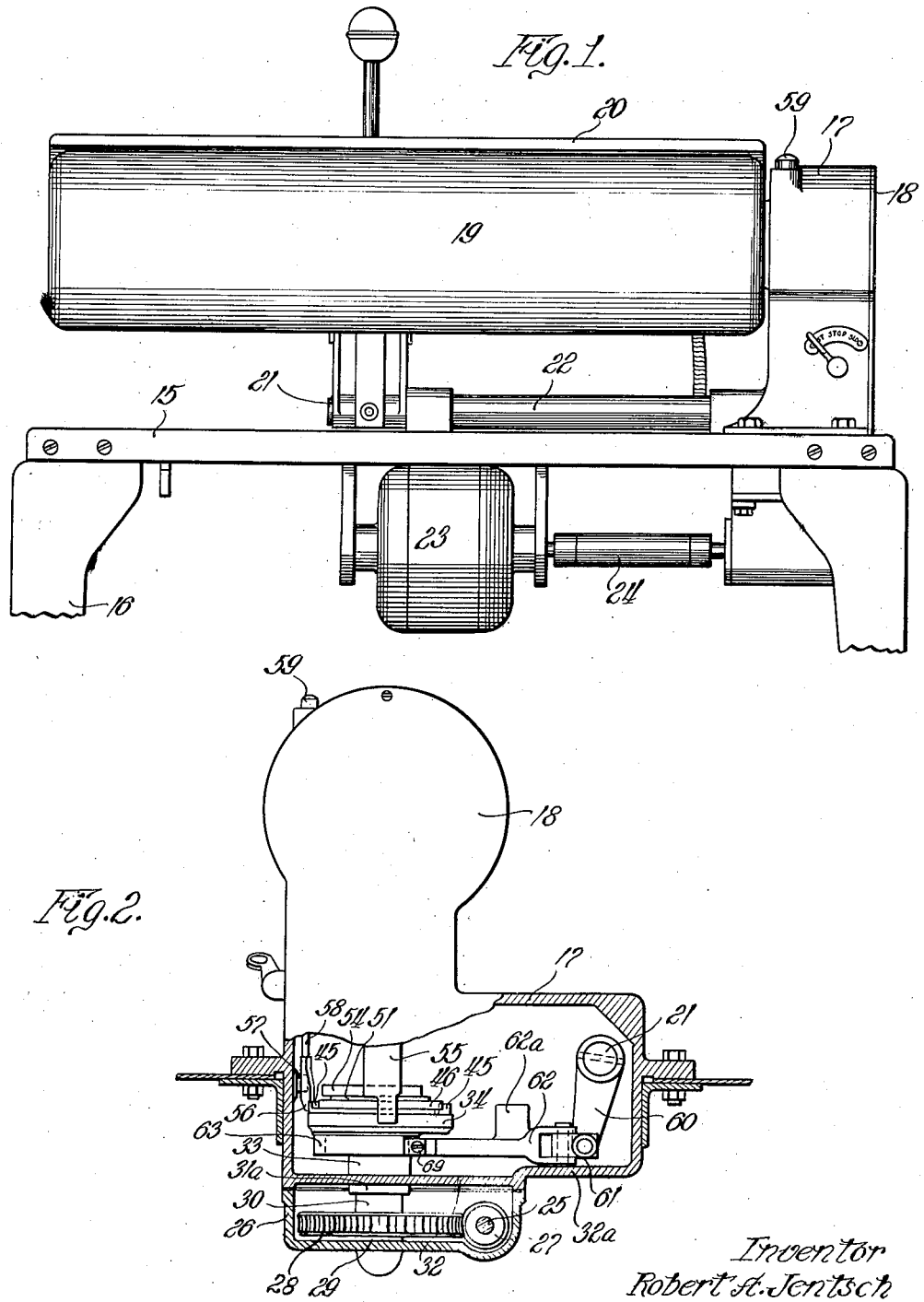
Inventor
Robert A. Jentsch
By Brown, Jackson, Boettcher + Dienner
Attys, Oct. 7, 1941.  R. A. JENTSCH  2,257,802
CLUTCH MEANS
Filed Jan. 25, 1939   3 Sheets-Sheet 2
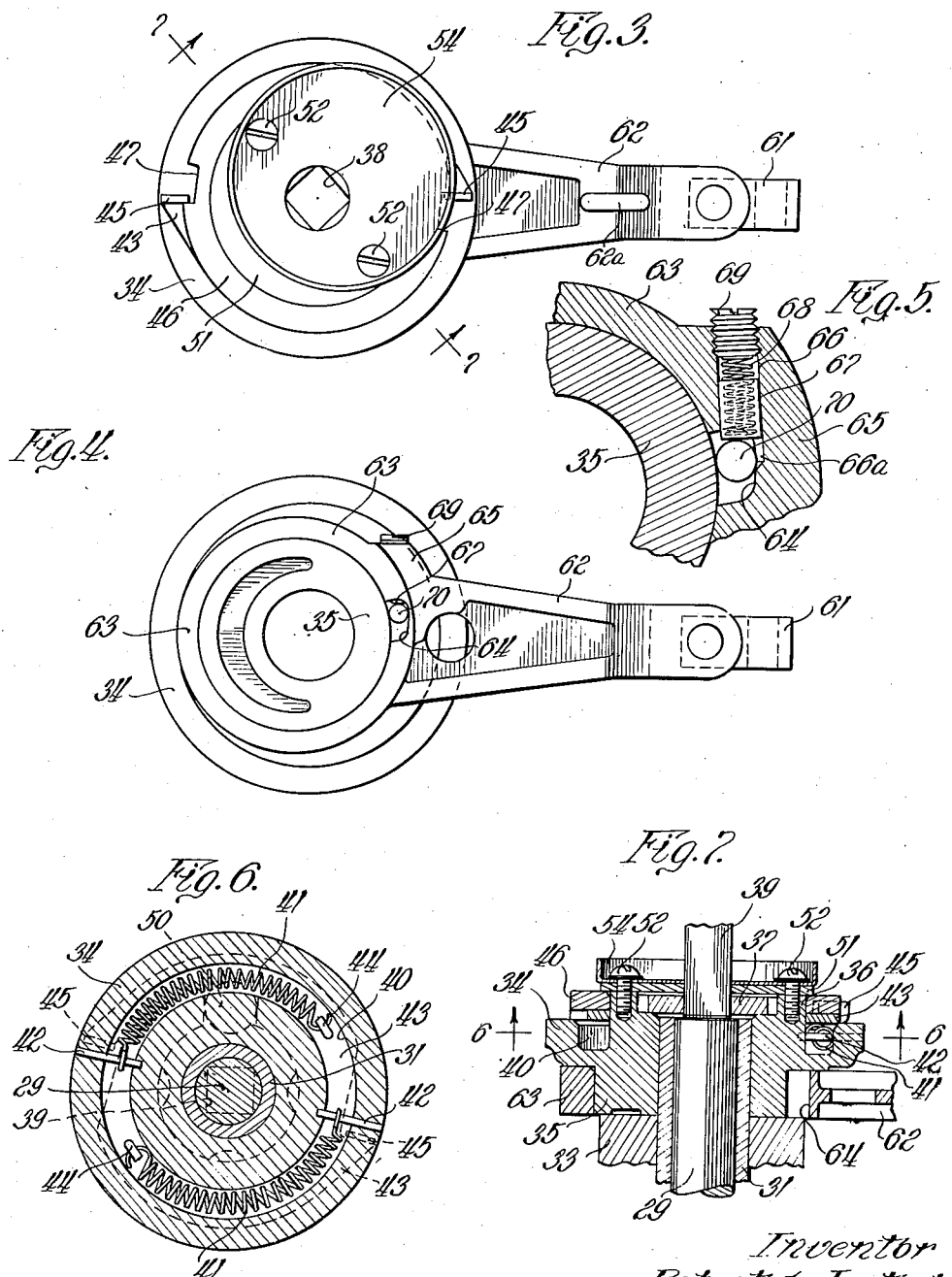

Inventor
Robert A. Jentsch

Patented Oct. 7, 1941

2,257,802

UNITED STATES PATENT OFFICE 2,257,802

CLUTCH MEANS

Robert A. Jentsch, Chicago, Ill., assignor to Conlon Corporation, Cicero, Ill., a corporation of Illinois Application January 25, 1939, Serial No. 252,735

4 Claims. (Cl. 192—27)

This invention relates to clutch means, and has to do with clutch means suitable for use in machines in which a part is moved from one position to another by means of a rockably mounted shaft, such as domestic ironing machines.

In Patent No. 1,980,757, issued November 13, 1934, to Rudolph W. Janda, there is disclosed an eccentric and clutch assembly for operating the shoe of an ironing machine, the clutch means embodying a coupling member or disc which is moved into and out of position for coupling together the parts of the clutch mechanism. That clutch has proved satisfactory in many respects and possesses certain desirable features of practical importance. It has been found, however, that if there is any appreciable looseness or play in the eccentric and the eccentric strap, the coupling member or disc is apt to be moved inward slightly, when the parts are declutched, into such position that it is struck by the teeth of the continuously rotating star wheel, the disc being then moved back and forth into and out of contact with the teeth of the star wheel, and causing a continual noise, or clicking, which is objectionable in itself. This continuous striking of the disc by the teeth of the star wheel also eventually causes objectionable wear of the parts.

The instant invention is directed primarily to the provision of clutch means possessing all of the desirable characteristics of the clutch of the above identified patent while avoiding the objectionable feature above referred to of clicking due to striking of the coupling member or disc by the teeth of the star wheel. More specifically, I provide means permitting rotation of the eccentric relative to the eccentric strap, in the direction in which the star wheel or drive member of the clutch means is driven, while preventing reverse rotation of the eccentric relative to the strap and avoiding any looseness between the eccentric and its strap such as would result in the objectionable clicking referred to. Further objects and advantages will appear from the detail description.

In the drawings:

Figure 1 is a front view of a domestic ironing machine, with the legs broken away, to which the clutch means of my invention is applied;

Figure 2 is an outer end view of the gear housing of the machine of Figure 1, partly broken away and in section, the bed plate of the machine being shown fragmentarily and in section;

Figure 3 is a plan view of the clutch assembly and the associated shoe operating arm;

Figure 4 is an underneath view of the assembly and arm shown in Figure 3;

Figure 5 is a fragmentary sectional view, on an enlarged scale, through the eccentric and the eccentric strap and associated elements, taken in a plane normal to the axis of rotation of the clutch parts, certain parts being shown in elevation;

Figure 6 is a sectional view taken substantially on line 6—6 of Figure 7, certain parts being shown in elevation;

Figure 7 is a sectional view taken substantially on line 7—7 of Figure 3, certain parts being shown in elevation and certain other parts being shown fragmentarily and broken away;

Figure 8:
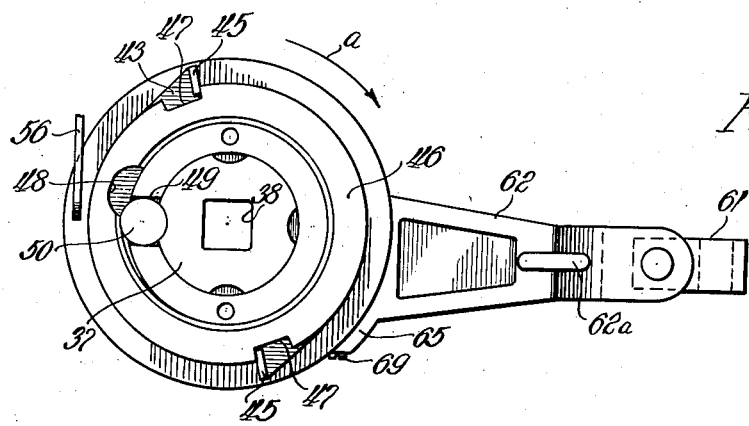
Figure 8 is a view on the order of Figure 3 but with certain parts removed for clearness of illustration, this view also showing the trip finger for effecting declutching.
Figure 9:
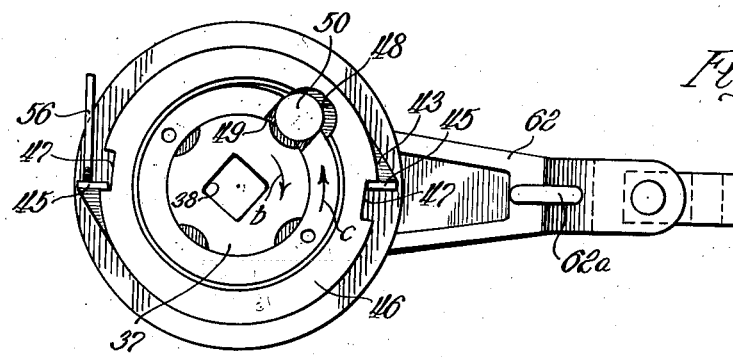
Figure 10:
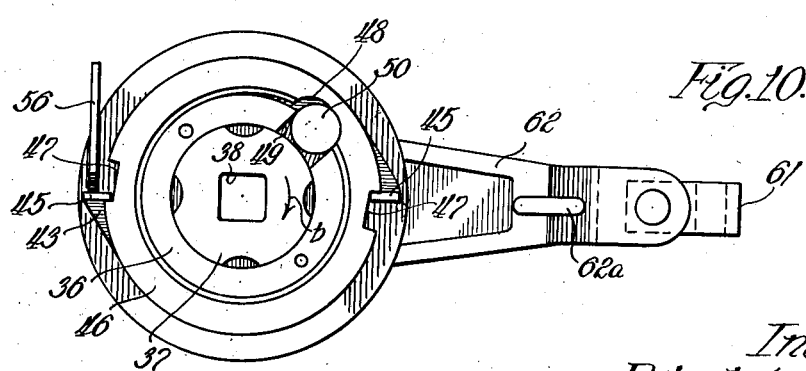

Figure 9 is a view on the order of Figure 8 but showing the parts of the clutch as declutched one from the other, this view illustrating the manner in which the coupling disc would be moved into position to be struck by the star wheel, causing the objectionable clicking above referred to, in the absence of means locking the eccentric against reverse rotation relative to the eccentric strap; and Figure 10 is a view similar to Figure 9 but illustrating the manner in which inward movement of the coupling disc is prevented, by provision of the means for locking the eccentric against reverse rotation relative to the eccentric strap.

I have illustrated the clutch means of my invention, by way of example, as applied to an ironing machine similar to that disclosed in Patent No. 2,054,631, issued September 15, 1936, to Rudolph W. Janda. The ironing machine comprises a suitable support or stand having a top bed plate 15 mounted upon depending legs 16. A gear casing 17, closed at its outer end by a removable cover plate 18, is suitably secured to bed plate 15 at one end thereof. A roll 19 extends inward over bed plate 15, from the housing 17, and cooperates with a shoe 20 suitably mounted on a shoe operating shaft 21, for movement therewith, this shaft being rockably mounted and extending through a tubular member 22 supported adjacent the back of bed plate 15 and a short distance above the upper face thereof. By rocking shaft 21 the shoe may be moved to and from the roll, in a known manner.

An electric motor 23, suitably supported by the bed plate 15, has driving connection, through a flexible coupling 24, to a worm shaft 25 rotatably mounted in a housing 26 appropriately secured to the bottom of gear housing 17. A worm 27, secured upon shaft 25, meshes with a worm wheel 28 rotatably mounted in housing 26 and suitably secured upon the lower end of a shaft 29. The latter shaft extends upward through hub 30 of worm wheel 28 and through a flanged bushing 31 seating at its lower end upon hub 30 and provided at its lower end with a flange 31a, confined between hub 30 and bottom wall 32 of housing 17. Bushing 31 extends upward through a collar 33 carried by wall 32. Bushing 31 also extends upward through an eccentric structure comprising a body element 34 (Figure 7), a depending eccentric 35 and an upwardly projecting annular flange 36 concentric with bushing 31.

Flange 36 defines a shallow cylindrical recess within which is disposed a star wheel 37 shown as having four teeth, though this star wheel may have any suitable number of teeth. It is provided with a central square opening 38 (Figure 8), which snugly receives squared element 39 of shaft 29, extending upward therefrom. So long as the circuit of motor 23 remains closed, the shaft 29 is continuously driven, star wheel 37 being likewise continuously driven.

Body element 34 of the eccentric structure is provided, in its upper face, with a channel 40 adjacent and extending about flange 36. This channel receives two similarly disposed tension springs 41 each of which is anchored, at one end, by means of a pin 42, to the eccentric structure. A clutch control yoke 43, of substantially annular form, fits about flange 36 for relative turning movement and provides a closure for the top of channel 40. The other end of each spring 41 engages a tongue 44 struck downward from yoke 43. The springs 41 are under tension and are effective for turning yoke 43 about flange 36 in a clockwise direction, as viewed in Figures 3 and 8. Yoke 43 is further provided with two diametrically disposed upwardly projecting tabs 45.

A clutch ring 46 seats upon yoke 43 and fits about flange 36 for relative turning movement. Ring 46 is provided with two diametrically opposite notches 47 which receive tabs 45 of yoke 43. Ring 46 is further provided with an inwardly opening arcuate recess 48 which, in one angular position of this ring relative to flange 36, is aligned with a slot 49 extending through this flange radially thereof. In another angular position of ring 46 relative to flange 36, shown in Figure 8, recess 48 is out of alignment with slot 49 and the ring is effective for holding a coupling disc 50, slidable in slot 49, in its inner position, in which the disc engages between two adjacent teeth of star wheel 37, being of appropriate diameter to that end, thus coupling the star wheel and the eccentric structure together for rotation as a unit. The tension springs 41 urge yoke 43 and, therefore, ring 46, clockwise relative to flange 36 and serve to maintain ring 46 in its position shown in Figure 8, so long as this ring and the yoke are free for rotation with the eccentric structure and the star wheel. The latter is rotated clockwise, as viewed from above, as previously noted, and the eccentric structure, when clutched to the star wheel, is also rotated clockwise as indicated by the arrow a in Figure 8. A retaining disc 51 is secured to flange 36, as by means of screws 52, and projects outward above ring 46, restraining the latter and yoke 43 against movement toward the upper end of flange 36, while also restraining star wheel 37 against upward movement. The screws 52 also serve to secure a shallow cup-shaped member 54 to disc 51, in eccentric relation thereto as shown in Figure 3. This member 54 actuates a lever 55 (Figure 2) for automatically controlling the drive of roll 19 in the manner set forth in detail in Patent No. 2,054,631, previously referred to. Such control of the roll drive is not of the essence of the present invention and need not be referred to here in greater detail.

The tabs 45 of clutch control yoke 43 cooperate with a trip finger 56, for declutching the eccentric structure from star wheel 37 at appropriate times. Referring to Figure 2, trip finger 56 is pivoted, at 57, on the front wall of gear housing 17. An operating rod 58 is suitably connected to the rearward portion of finger 56 and is normally held raised by compression spring means (not shown), there being a push button 59 on the upper end of this rod. The forward end of finger 56 is thus normally held depressed, in position at the upper face of body element 34 of the eccentric structure, and in the path of travel of the tabs 45 when the eccentric structure is rotated. Normally, one of the tabs is in contact with finger 56, effective for declutching the eccentric structure from the star wheel, as will be explained presently. By depressing button 59, the forward end of trip finger 56 is raised into inoperative position, releasing yoke 43 which is then turned clockwise by the tension springs 41, thus turning the ring 46 into position to effect the clutching operation, in the manner previously described, such movement of the ring being caused by contact of the tabs 45 with the leading shoulders of the notches 47, as will be clear from Fig. 8. The eccentric structure then turns through 180 degrees, with the star wheel 37, at the end of which turning movement it is again declutched from the star wheel by contact of the other tab 45 with the trip finger 56.

Referring further to Figure 2, an arm 60 is secured to and depends from shoe operating shaft 21, within the gear housing 17. The lower end of arm 60 is connected, by a universal connection 61, to the rearward end of an arm 62, as in the Janda Patent 1,980,757, above referred to. At its forward end arm 62 is provided with an eccentric strap 63 which fits snugly, but not tightly, about the eccentric 35. Turning of the eccentric 35 from one position through 180 degrees into its other position, causes rocking movement of shaft 21 from its one position to its other position, as will be obvious. This rocking movement of the shaft serves to move the shoe 20 to and from the roll 19, in a known manner.

Referring to Figures 4 and 5, eccentric strap 63 is provided with an inwardly opening recess 64 which decreases in extent radially of eccentric 35 in the opposite direction to the direction of rotation of the eccentric, the latter being rotated clockwise as viewed from above and the radial extent of recess 64 decreasing counterclockwise as viewed from above. That will be clear from Figure 8, in which the direction of rotation of the eccentric, as viewed from above, is indicated by the arrow a. Strap 63 is further provided with an integral enlargement or boss 65, from the outer end of which extends a bore 66 opening into recess 64 at the end thereof of greater radial extent. Bore 66 slidably receives a plunger 67 of tubular formation, closed at its inner end and open at its outer end. A coil compression spring 68 is mounted in bore 66 and plunger 67, and is confined between the inner end of the plunger and a screw plug 69 threaded into the enlarged threaded outer portion of bore 66. Preferably, this bore extends a short distance into boss 65, as at 66a, to prevent ejection of plunger 67 from bore 66 by compression spring 68, when movement of the plunger inward of recess 64 is not otherwise limited, as will appear presently. A steel roller 70 is mounted in recess 64, at the midportion thereof, and is confined between the outer wall of this recess and the circumferential face of eccentric 35. Plunger 67 contacts roller 70 and, in conjunction with compression spring 68, yieldingly urges this roller toward the end of recess 64 of lesser radial extent, that is, in a clockwise direction as viewed from beneath as in Figure 4. It will be seen that the eccentric 35 is free to rotate clockwise, as viewed from above as in Figure 3, relative to strap 63, but is locked against reverse rotation by means of the roller 70. This spring pressed roller also serves to take up wear between the eccentric and the strap, serving at all times to lock the eccentric against reverse rotation, in the manner stated.

It has been assumed in Figure 9, for purposes of description, that the roller 70 and associated parts for locking the eccentric 35 against reverse rotation, have been omitted. In Figure 9 the parts are shown as declutched, with the star wheel 37 continuing to rotate in clockwise direction, as indicated by the arrow b. Under the conditions assumed, one of the tabs 45 of yoke 43 contacts finger 56, thus holding the yoke against rotation. Immediately thereafter, the following shoulders of notches 47 of ring 46 contact tabs 45, thus stopping rotation of the ring. The eccentric structure remains clutched to the star wheel 37 until it has turned into such position that slot 49 is aligned with recess 48 of ring 46, at which time the coupling disc 50 moves outward through slot 49 into recess 48, into position to clear the teeth of star wheel 37, thus declutching the eccentric structure from the star wheel. After rotation of yoke 43 with the eccentric structure has been stopped, by the trip finger, further rotation of the eccentric structure, to effect the declutching operation, places the tension springs 41 under increased tension, additional to the tension under which these springs are placed when the ring 46 is in clutching position, shown in Figure 8, as will be obvious. Since the yoke 43 and the ring 46 are held against rotation, the reaction of the springs 41 tends to turn the eccentric structure in a counterclockwise direction, as viewed in Figure 9. Accordingly, if means be not provided for locking the eccentric structure against such reverse rotation, as has been assumed, the eccentric structure will actually be turned counterclockwise, as indicated by the arrow c. Such counterclockwise movement of the eccentric structure moves the disc 50 into contact with the following end wall of recess 48 and then forces the disc inward through slot 49 between two adjacent teeth of the star wheel 37. The following tooth of the star wheel then forces the disc 50 outward through slot 49 into contact with the following end of recess 48, with corresponding counterclockwise movement of ring 46. The disc 50 remains in this latter position until the space between the next two adjacent teeth of the star wheel 37 is brought into alignment with slot 49, at which time ring 46 again forces disc 50 inward between the teeth of the star wheel, the disc being then again forced outward by the star wheel. In that manner the disc 50 is forced inward and outward through the slot 49 and is struck by the teeth of the star wheel 37, causing an objectionable clicking sound, which is in itself objectionable, while also subjecting the star wheel and associated parts to objectionable stresses and pounding. In theory, the objectionable action referred to might possibly be prevented by having an absolutely accurate fit between the eccentric and the eccentric strap, and eliminating all looseness or play between the parts. In practice, however, that requires work of great precision and, from the practical standpoint, is impossible. It is necessary, to eliminate binding of parts, that there be some slight clearance between the eccentric 35 and the eccentric strap 63, and some wear between these parts, in the use of the machine, is inevitable. By providing the locking roller 70 and associated parts, I prevent reverse rotation of the eccentric structure relative to the eccentric strap and thereby eliminate possibility of reciprocation of the coupling disc 50 in slot 49, with the objectionable clicking referred to, even when there is considerable looseness or play between the eccentric and the strap.

Referring to Figure 10, when one of the tabs 45 contacts the trip finger 56, rotation of yoke 43 is stopped and, immediately thereafter, rotation of ring 46 is stopped. The eccentric structure turns a short distance further in clockwise direction, sufficient to bring slot 49 into alignment with recess 48, at which time the disc 50 is forced outward through the slot into the recess, then occupying the position shown in Figure 10. Since the eccentric structure is held against reverse rotation, by the locking means above described, it cannot be moved into such position as to force the disc 50 inward so as to be struck by the teeth of the star wheel 37. Accordingly, disc 50 remains in the position shown in Figure 10, in which position it is clear of the teeth of the star wheel, no clicking occurs, and the star wheel and associated parts are relieved of stresses and pounding such as occur when the eccentric structure is not locked against reverse rotation, as above explained.

It is of importance that the roller 70 and associated parts be disposed in proper relation to the eccentric 35. Arm 62 is provided with an upwardly projecting element or lug 62a. This lug is so disposed, relative to bottom wall 32—32a of gear housing 17, and of such height, as to preclude possibility of placing arm 62 in inverted position within housing 17. That assures proper disposition of the eccentric strap and associate parts relative to the eccentric, as will be obvious.

While I have illustrated my invention, by way of example, as embodied in a clutch mechanism for an ironing machine, changes in construction and arrangement of parts thereof may be resorted to, without departing from the field and scope of my invention, and I intend to include all such variations, as fall within the scope of the appended claims, in this application, in which the preferred form only of my invention has been disclosed.

I claim:

1. In mechanism of the character described, a drive member rotatable in one direction, an eccentric, means for clutching and declutching said eccentric to and from said drive member, comprising means urging said eccentric about said drive member in the opposite direction when said eccentric is declutched from said drive member, an eccentric strap fitting about said eccentric and provided with an inwardly opening recess decreasing in extent radially of said eccentric in said opposite direction, a roller in said recess confined between the outer wall thereof and said eccentric, and means yieldingly urging said roller toward the end of said recess of lesser radial extent.

2. In mechanism of the character described, a drive member rotatable in one direction, an eccentric, means for clutching and declutching said eccentric to and from said drive member, comprising means urging said eccentric about said drive member in the opposite direction when said eccentric is declutched from said drive member, an eccentric strap fitting about said eccentric, said strap having an inwardly opening recess decreasing in extent radially of said eccentric in said opposite direction, a spring pressed plunger at the end of said recess of greater radial extent and urged toward the opposite end thereof, and a locking roller in said recess spaced from the end thereof of lesser radial extent and confined between the outer wall of said recess and said eccentric, said plunger urging said roller toward the end of said recess of lesser radial extent.

3. In mechanism of the character described, a driven shaft continuously rotated in one direction, means for driving said shaft, an eccentric free from said shaft, clutch means for clutching said eccentric to said shaft and declutching it from said shaft upon completion of a half revolution of said eccentric, said clutch means comprising means urging said eccentric about said shaft oppositely to the direction of rotation of the latter when said eccentric is declutched from said shaft, an eccentric strap fitting about said eccentric, and locking means effective for permitting rotation of said eccentric in said one direction relative to said strap while locking said eccentric against reverse rotation relative to said strap in the continued rotation of said shaft.

4. In mechanism of the character described, a drive member rotatable in one direction, an eccentric, means for clutching and declutching said eccentric to and from said drive member, comprising means urging said eccentric about said drive member in the opposite direction when said eccentric is declutched from said drive member, an eccentric strap fitting about said eccentric and provided with an inwardly opening recess decreasing in extent radially of said eccentric in said opposite direction, and a locking member in said recess confined between the outer wall thereof and said eccentric and yieldingly urged toward the end of said recess of lesser radial extent.

ROBERT A. JENTSCH.